June 8, 1937.  H. M. WILHELMY  2,082,928
VEHICLE FLOOR MAT
Filed May 11, 1935

INVENTOR.
HELEN M. WILHELMY
BY
Kwis, Hudson & Kent
ATTORNEYS

Patented June 8, 1937

2,082,928

UNITED STATES PATENT OFFICE

2,082,928

VEHICLE FLOOR MAT

Helen M. Wilhelmy, Shaker Heights, Ohio, assignor to The Ohio Rubber Company, Willoughby, Ohio, a corporation of Ohio Application May 11, 1935, Serial No. 21,014

5 Claims. (Cl. 296—1)

This invention relates to vehicle floor mats of the type having surface ornamentation, and as its principal object aims to provide an improved mat of this kind having a novel surface characteristic which renders the mat attractive in appearance and enables the same to be readily cleaned.

Another object of the invention is to provide an improved vehicle floor mat having ribs thereon extending in substantially continuous lines between two adjacent sides of the mat.

Still another object of the invention is to provide an improved vehicle floor mat comprising a rubber wear sheet having ribs and grooves molded thereon and extending in substantially continuous lines from an end of the mat to a side thereof.

A further object of the invention is to provide a novel floor mat for use in a vehicle compartment having a door opening, comprising a wear sheet having ribs and grooves on the surface thereof and extending in substantially continuous lines from an end of the sheet toward said door opening.

It is also an object of this invention to provide an improved floor mat for a vehicle compartment having door openings, comprising a wear sheet having ribs and grooves covering substantially one-half of the sheet and extending in continuous lines which curve toward one door opening, and ribs and grooves covering substantially the other half of the sheet and extending in continuous lines which curve toward the other door opening.

Other objects and advantages of the invention will be apparent from the following description, when taken in conjunction with the accompanying sheet of drawing wherein—

Figure 1:
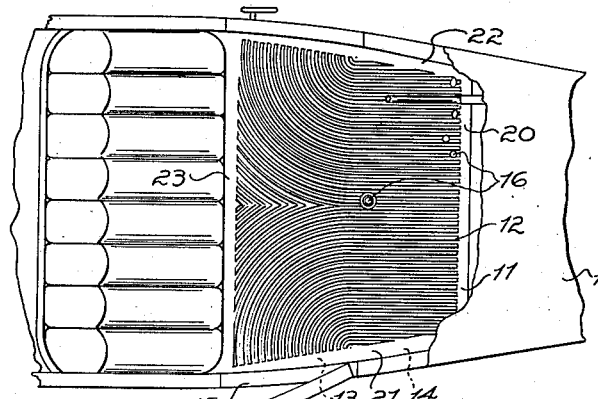
Fig. 1 is a plan view with parts broken away showing my novel floor mat in place in a vehicle compartment.

In the accompanying drawing to which detailed reference will now be made, I have shown a vehicle floor mat having a novel surface characteristic which renders the mat attractive in appearance yet which enables the mat to be readily cleaned, as by brushing or sweeping, without removing the same from the vehicle compartment.

While the mats shown in the drawing represent what I now regard to be the preferred form of my invention, it will be understood that they are illustrative only and that the principle of the invention may be embodied in various other mat constructions.

In Fig. 1 of the drawing I have represented a vehicle 10 having a compartment 11 in which my novel floor mat 12 has been fitted. The compartment illustrated in this instance is a driver's compartment having the usual horizontal floor section 13 and the usual upwardly and forwardly inclined toe board section 14, but it will be understood, of course, that my novel floor mat may be used in vehicle compartments other than the driver's compartment. The vehicle 10 is shown as having the usual door openings 15 at opposite sides thereof leading into the compartment 11.

Figure 2:
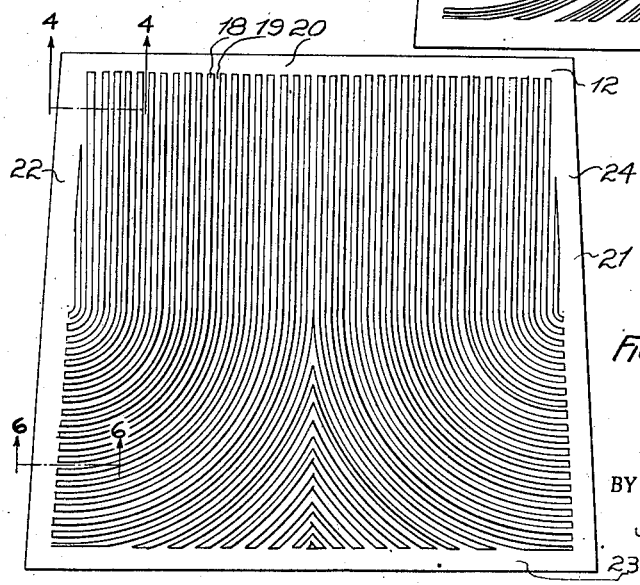
Fig. 2 is a plan view of the floor mat apart from the vehicle.

My novel floor mat 12 comprises a wear sheet which, as shown in Figs. 1 and 2, may be of a size and shape to cover the floor sections 13 and 14 of the vehicle compartment and to conform substantially to the shape or outline of the compartment. The wear sheet may be formed of any suitable material such as a thermoplastic and, for example, may comprise a resilient and flexible layer or sheet of vulcanized rubber. The mat may be applied directly to the flooring of the compartment or may be applied to the flooring with any suitable cushioning and insulating layer or backing therebetween. It will be understood, of course, that the mat may be provided with suitable openings 16 therethrough to accommodate the various vehicle controls. These openings may be formed through the mat during the manufacture thereof or may be cut therethrough in connection with the fitting of the mat to the vehicle compartment.

In accordance with my invention I provide the wear sheet with a novel surface characteristic in the form of ribs and grooves 18 and 19, which are so arranged as to permit dust or other foreign matter to be readily swept or brushed along the surface of the mat and at the same time moved toward the door openings 15. This rib and groove arrangement is illustrated in Figs. 1 and 2 of the drawing, wherein I show the ribs and grooves extending between an end of the mat, in this instance the front or forward end 20, and the two adjacent sides 21 and 22 thereof. The ribs and grooves preferably extend in substantially continuous lines, so that the dust or other foreign matter can be brushed or swept therealong without the need of any brushing across or transversely of the ribs.

The ribs may be arranged in various ways to secure this desired result, but, as shown in this instance, I show the ribs and grooves running longitudinally of the vehicle and extending rearwardly from the end 20 toward the opposite end 23 for a substantial portion of the length of the mat, and then curving outwardly toward the opposite sides 21 and 22. With this arrangement it will be seen that all or nearly all of the ribs and grooves can be arranged to extend in continuous lines, with one end of the ribs and grooves at or adjacent the end portion 20 of the mat and the opposite end at or adjacent one of the sides of the mat. Furthermore, it will be seen that with the rib and groove arrangement which I have just described, the ribs and grooves can be made to terminate at that side portion of the mat which is substantially coextensive with the door opening 15, so that dust or other foreign material, which has been brushed or swept along the ribs and grooves and away from the end portion 20, can be ejected through the door openings by a continuation of the sweeping movement.

Figure 4:
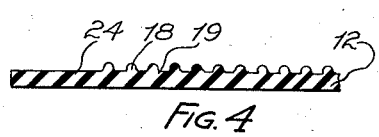
Fig. 4 is a partial sectional view taken through the mat of Fig. 2 as indicated by the line 4—4.
Figure 6:
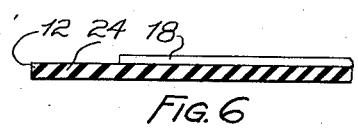
Fig. 6 is another partial transverse sectional view taken through a portion of the mat of Fig. 2 as indicated by line 6—6.

As shown in Figs. 1 and 2 of the drawing, the ribs and grooves may be arranged so that the ribs and grooves which cover one-half of the mat will extend in straight parallel lines for a portion of the length of the mat and then curve outwardly and terminate adjacent the door opening at one side of the vehicle compartment, and the ribs and groove which cover the other half of the mat will extend in straight parallel lines for a portion of the length of the mat and then curve outwardly and terminate adjacent the door opening at the other side of the vehicle compartment. The ribs and grooves may, if desired, be carried out to the extreme edges of the mat, but I prefer to terminate them just inwardly of the mat edges so as to leave a margin or border 24 therearound. The ribs and grooves may be formed on the surface of the wear sheet by any suitable method or apparatus, but I prefer to form them by a molding operation, preferably during the vulcanizing of the rubber or rubber-like material constituting the wear sheet. In forming these ribs and grooves I prefer to have the ribs extend or project above the surface of the sheet and the surface of the border portion 24, as shown in Fig. 4, so that the foreign matter being swept or brushed along the grooves can readily pass over the border without obstruction.

Figure 5:
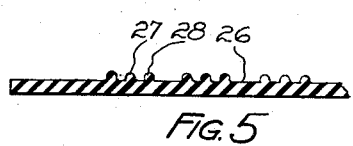
Fig. 5 is a similar sectional view of the mat of Fig. 3 and taken as indicated by the line 5—5.
Figure 3:
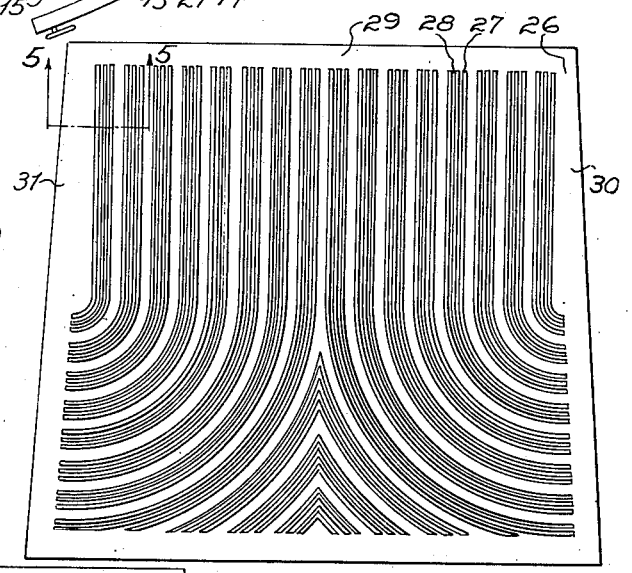
Fig. 3 is a plan view of another floor mat embodying my invention but having a different surface pattern.

In Fig. 3 of the drawing I have shown another vehicle floor mat 26, which is generally similar to that already described, and comprises a wear sheet of rubber, or the like, having ribs and grooves 27 and 28 on the surface thereof. These ribs and grooves also extend in substantially continuous lines rearwardly from the front end 29 of the mat and then curve outwardly toward the sides 30 and 31 to terminate adjacent the opposite door openings of the vehicle compartment in which the mat is to be used. The rib pattern of the mat of Fig. 2 is different from the mat of Fig. 3, in that the ribs of the former mat are uniformly spaced, as shown in Fig. 4, whereas the ribs of the mat of Fig. 3 are arranged in uniformly spaced groups as shown in Fig. 5.

From the foregoing description and accompanying drawing it will now be readily seen that I have provided a vehicle floor mat having a novel surface characteristic, such that foreign matter can be readily brushed or swept along the mat and ejected through the door openings without the need of sweeping or brushing the material transversely of ribs, or other surface irregularities, which would result in much dust and scattering of the material being swept. It will also now be readily understood that with the rib and groove arrangement which I have provided the ribs and grooves extend in substantially continuous lines along the mat and then curve outwardly and terminate at or adjacent a door opening, such that the dust or other foreign material can be swept or brushed along the grooves and ribs and then outwardly through the door opening as a substantially continuous or progressive sweeping or brushing action.

While I have illustrated and described the novel floor mat of my invention it will be understood, of course, that I do not wish to be limited to the precise details and arrangements illustrated and described, but regard the invention as including such changes and modifications as do not involve a departure from the spirit of the invention and the scope of the appended claims.

Having thus described my invention, I claim:

1. A vehicle floor mat comprising a wear sheet of rubber or the like having ribs and grooves molded thereon in an arrangement to facilitate cleaning, said ribs and grooves starting adjacent one end of the sheet and extending longitudinally for a substantial portion of the length of the sheet and then curving outwardly and terminating adjacent a side of the sheet.

2. A vehicle floor mat comprising a wear sheet of rubber or the like having a rib pattern on the surface thereof with the ribs arranged to facilitate cleaning of the mat surface, said ribs starting adjacent one end of the sheet and extending in substantially straight parallel lines for a substantial portion of the length of the sheet and then curving outwardly and terminating adjacent a side of the sheet.

3. A vehicle floor mat comprising a wear sheet having ribs on the surface thereof and disposed to facilitate cleaning of the mat surface, said ribs starting adjacent one end of the mat and extending longitudinally thereof for a substantial portion of the length of the mat and then curving outwardly with substantially one-half of the ribs curving outwardly toward one side of the mat and substantially another half of the ribs curving outwardly toward the other side of the mat.

4. In combination with a vehicle compartment having opposed door openings, a floor mat comprising a wear sheet having ribs on the surface thereof and disposed to facilitate cleaning of the mat surface, said ribs starting adjacent an end of the mat and extending longitudinally for a substantial portion of the length of the mat and then curving outwardly with substantially one half of the ribs curving outwardly toward one of said door openings and substantially another half of the ribs curving outwardly toward the other of said door openings.

5. In combination with a vehicle compartment having opposed door openings, a floor mat comprising a wear sheet having ribs on the surface thereof and disposed to facilitate cleaning of the mat surface, said ribs starting adjacent an end of the mat and extending longitudinally thereof to a point approximately opposite one side of the door openings and then curving outwardly with substantially one-half of the ribs curving outwardly toward one of said door openings and substantially another half of the ribs curving outwardly toward the other of said door openings.

HELEN M. WILHELMY.